Aug. 13, 1929.   P. GALASSO   1,724,273
MEANS AND DEVICE TO VAPORIZE HEAVY LIQUID FUEL FOR
USE AS DRIVING POWER IN GAS ENGINES GENERALLY
Filed May 28, 1924   3 Sheets-Sheet 1

Inventor
Pietro Galasso,
By Marks & Clerk
his Atty's.

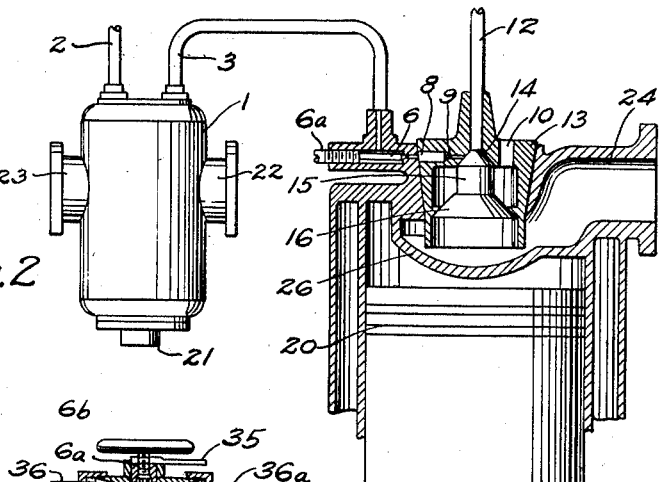
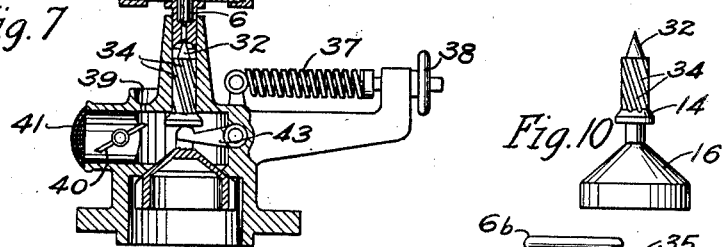
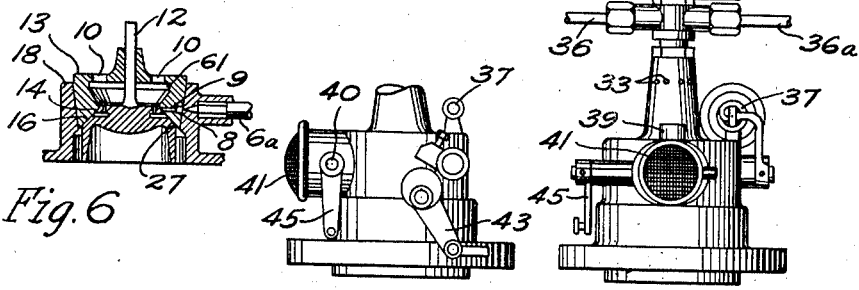

Aug. 13, 1929. P. GALASSO 1,724,273
MEANS AND DEVICE TO VAPORIZE HEAVY LIQUID FUEL FOR
USE AS DRIVING POWER IN GAS ENGINES GENERALLY
Filed May 28, 1924 3 Sheets-Sheet 3
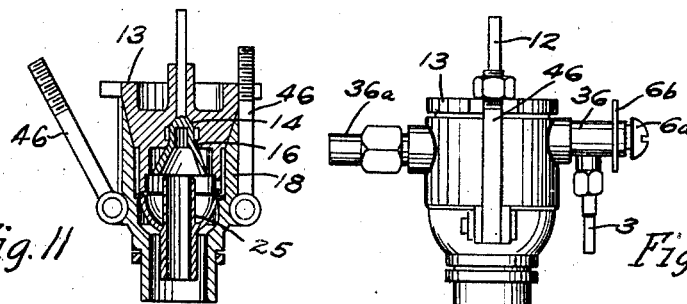
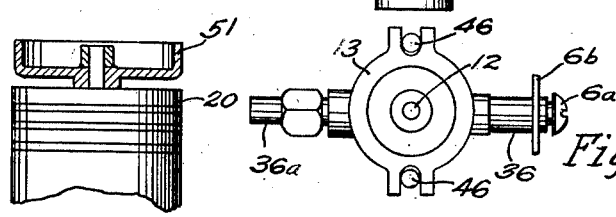
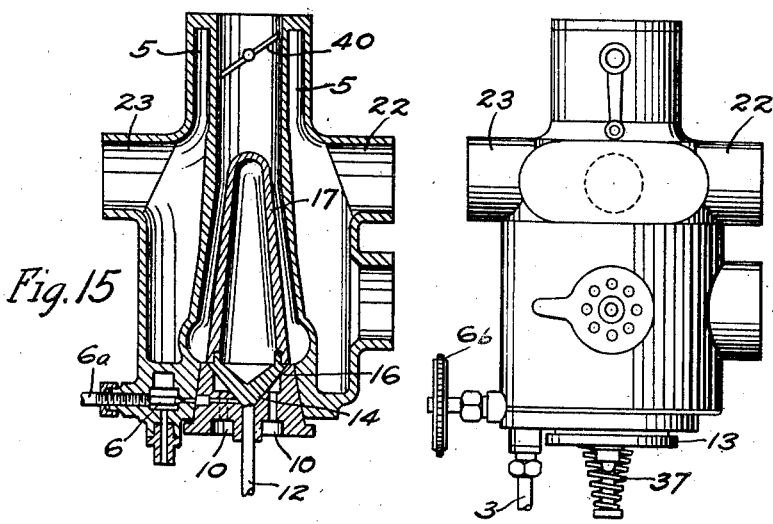
INVENTOR.
Pietro Galasso
BY Marks &Clerk
his ATTORNEYS.

Patented Aug. 13, 1929.

1,724,273

UNITED STATES PATENT OFFICE.

PIETRO GALASSO, OF META DI SORRENTO, ITALY, ASSIGNOR TO SOCIETÀ ITALIANA "VOP", OF NAPLES, ITALY, A COMPANY OF KINGDOM OF ITALY.

MEANS AND DEVICE TO VAPORIZE HEAVY LIQUID FUEL FOR USE AS DRIVING POWER IN GAS ENGINES GENERALLY.

Application filed May 28, 1924, Serial No. 716,526, and in Italy August 20, 1923.

This invention relates to a device for preheating and vaporizing fuels for internal combustion engines and more particularly to the construction of a preheater and intake valve for a vaporizer for fuels, the device being incorporated in the intake conduit of an internal combustion engine.

It is well known to provide a two seat valve to control the fuel and mixture, said valve being suction-actuated and constructed with its two seats spaced apart, the fuel being controlled at one of the valve seats, and the mixture, which is made in a chamber between the valve seats and into which air has access, at the other valve seat. It is also known in some forms to heat the fuel inlet pipe by surrounding a comparatively short portion of its length by an exhaust or hot air jacket and in other forms to heat the valve, say by the exhaust from the engine or by conduction from the cylinder, but my invention differs from what has been previously proposed in that I heat the fuel in bulk at a distance from the valve, said fuel being then admitted through one of the valve seats under pressure and forced against and broken up by the co-acting parts of the valve.

The part of the valve between the seats may be formed of large area or a part of large area may be carried below the valve said valve and the said large part being heated so as to thoroughly gasify the mixture and thus enhance its combustion and explosive properties.

My device may be attached to the engine cylinders so as to supply the mixture directly into the combustion chambers or the device may supply the mixture to an induction pipe. The heating of the valve and its connecting part or stem may be direct from the combustion chambers or cylinders or the appended large part may be heated by employing the exhaust gas.

One of the objects of this invention is the provision of a specially constructed valve of the type above referred to, said valve being exposed to the heat generated within the combustion chamber of the engine. Another object of this invention is to provide a preheater through which the liquid fuel is first passed as it is being delivered to the engine. A further object is to provide for admixture of incoming air with the preheated fuel in a recess adjacent the combustion chamber, said recess being subjected to the heat generated in the combustion chamber, thus insuring proper vaporization of the fuel and a complete admixture of the fuel and air, even though the fuel be one of the heavier types of combustible oils employed in combustion engines.

Other objects will be apparent from the following description taken in connection with the appended drawings in which:—

Fig. 2 is an elevation, partly in section, of an arrangement similar to that shown in Fig. 1, the mixing chamber being in communication with an intake manifold.

Fig. 6 shows still another type of double valve.

Figs. 7, 8 and 9 show sectional, side and front views respectively of a valve operating mechanism.

Fig. 10 is an elevation of one form of the valve.

Figs. 11, 12 and 13 are different views of another type of valve with means for attaching the same to an engine.

Fig. 14 shows a collector cup for unburnt material, the same being attached to the piston.

Figs. 15 and 16 show sectional and side views of a jacket for heating the fuel as it enters the intake of the engine.

Figures 1, 3, 4, 5:
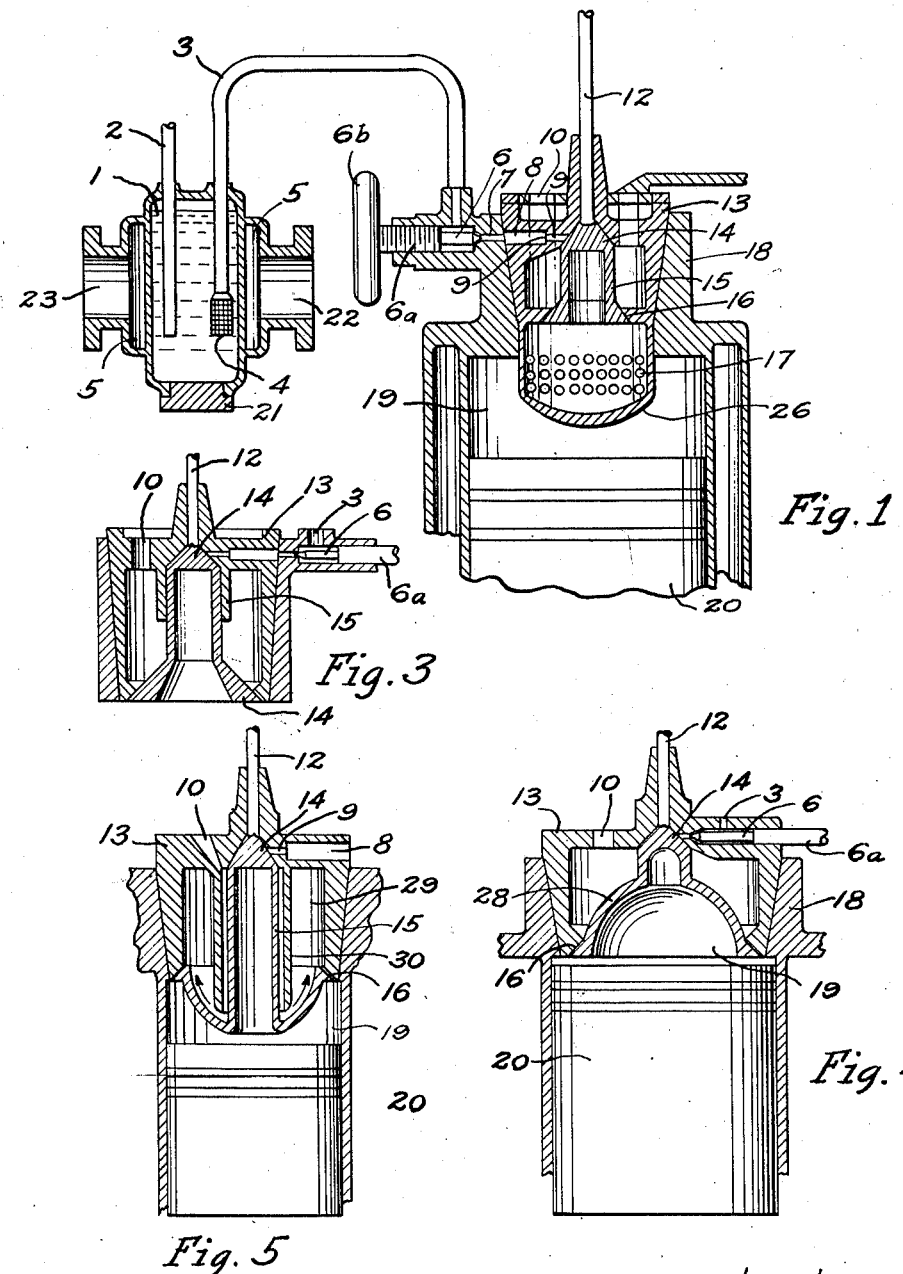
Fig. 1 is a sectional elevation of the device shown in connection with a single cylinder of an internal combustion engine.
Figs. 3 and 4 are elevations in section of two forms of the double valve.
Fig. 5 shows another type of valve mounted for reciprocation in a heated cylindrical skirt.

Referring to the drawings it will be seen that fuel is delivered under pressure to a superheating tank 1 through a delivery pipe 2. No vent is provided in the tank 1, the fuel always remaining under pressure. The tank 1 is heated by means of a heating medium, preferably exhaust gases from the engine, the particular heating medium employed being delivered to a jacket 5 surrounding the tank 1 through the opening 22. The opening 23 permits escape of the exhaust gases or other heating medium. Access to the interior of tank 1 may be had by removing plug 21.

For convenience the heating medium will be referred to hereinafter as exhaust gases. After being heated in the tank 1, the fuel is conducted through the pipe 3, which is provided with a filter 4, to a vaporizing needle 6, said needle being regulable by means of the threaded stem 6ª and the hand wheel 6ᵇ. Through a passage 7, which is in alignment with passages 8 and 9 in a removable head 13, the fuel is conveyed to a conical seat in which is adapted to rest a conical valve 14. The valve 14 forms a portion of a double valve on the stem 12, there being also a second conical portion 16 spaced from portion 14 by a cylindrical portion 15, preferably hollow and open at its end.

It will thus be seen that the fuel is first preheated, preferably to a temperature exceeding that necessary to vaporize the fuel, and delivered to the engine, first through a vaporizing nozzle, and then through a double valve. The construction of the valve is such that the vaporized fuel is exposed to a relatively large heated surface in passing through the head 13 to the combustion chamber 19 of the engine. The head 13 is preferably tapered, the top of the cylinder block having a correspondingly tapered opening into which the head 13 is firmly secured by any suitable securing means. A tight joint between the head and cylinder block is thus obtained. The block is further provided with openings 10 through which air is drawn. The head 13 is provided with a recess into which the air and vaporized fuel are drawn and, since the temperature of the block is relatively high, thorough admixture of the fuel and air is obtained in the recess. This recess is closed at one end by the valve 14 and its other end by the valve 16. The double valve thus insures a thorough vaporization of the fuel entering the recess and a complete admixture of fuel and air as it leaves the recess.

As shown in Fig. 1, a cup shaped chamber 26 is provided on the head 13. This chamber is in communication with the recess referred to above through the valve 16 and communicates with the combustion chamber 19 through suitable openings 17. The chamber 26 is directly exposed to the combustion chamber 19 and for this reason the carbureted gas is thoroughly preheated before entering the combustion chamber.

In Fig. 2 is shown a modification of the preheating chamber 26, the mixture of fuel and air passing to an intake manifold 24 before entering the combustion chamber. As in Fig. 1, the chamber 26 is exposed to direct heat from the combustion chamber but does not open directly to the combustion chamber.

The valves shown in Figs. 3, 4 and 5 differ in some respects from those disclosed in Figs. 1 and 2. In Fig. 3 the wall of the cylinder and the conical portion of the valve 16 converge to direct the gases drawn into the cylinder. In Figs. 4 and 5 are shown semi-spherical portions 28, oppositely directed, to provide for further heating of the valve. There is also shown in Fig. 5 a skirt 30 to form a tortuous course for the incoming gases which are further heated in the recess 29.

The valve shown in Fig. 6 is to be used where a limited height is necessary, the annular space between the valves communicating with the air intake through apertures 61 in the valve body.

In Figs. 7, 8 and 9, are shown a valve actuating mechanism comprising a lever 43, the valve being held normally closed by a spring 37, the tension of which may be adjusted by the wheel 38. In this particular type of valve the stem is provided with helical channels 34 and a tapered end 32 (as shown in Fig. 10). The fuel is delivered through supply pipes 36, 36ª, the air supply being regulated by a throttle valve 40 having a lever 45 in the intake 41. Water may be supplied to the mixture through opening 39 in the intake conduit.

Modifications in the details of construction are illustrated in Figs. 11 to 16 inclusive. In Figs. 11 to 13 are shown means for securing the head 13 to the block 18, comprising hinged bolts 46. In Fig. 14 is shown a cup 51 adapted to collect unburnt material, while in Figures 15 and 16 are illustrated a modified form of preheating jacket surrounding the intake valve.

From the above description it will be apparent that liquid fuel drawn into an internal combustion engine through the apparatus described will be thoroughly vaporized and mixed with the air necessary to complete combustion. The particular form of double valve insures complete vaporization of fuel and admixture of fuel and air and spreads the resultant mixture in a conical stream in the heating chamber 26. By employing a device of the nature described it is possible to employ heavy oils which do not vaporize readily at normal temperatures or in the carburetors commonly used in internal combustion engines.

Having described my invention what I claim is:

1. In a combustion motor, a fuel superheater, a cylinder, a regulating valve, a double inlet valve, and means for conveying fuel from the fuel superheater through said regulating valve to a port controlled by one part of the said double inlet valve, the other part of which controls the admission of the fuel to the cylinder.

2. In a combustion motor, a fuel superheater, a cylinder, a regulating valve, a hollow double inlet valve, means for conveying fuel from the fuel superheater through said regulating valve to a port controlled by one part of the double inlet valve, the other part of which controls the admission of fuel to the cylinder, and means for regulating the passage of fuel to the said inlet port.

3. In a combustion motor, a fuel superheater, a cylinder, a regulating valve, a double inlet valve, means for conveying fuel from the fuel superheater through said regulating valve to a port controlled by one part of the double inlet valve, the other part of which controls the admission of fuel to the cylinder, and means for introducing air between said ports, whereby the fuel is vaporized by one part of said valve and admixed with air in the other part of said valve.

4. In a combustion motor as claimed in claim 1, said double seat valve being provided with a relatively large surface area between said ports, said area being exposed to heat from said cylinder, whereby said surface is exposed to the mixture of air and fuel before passing the part of valve controlling admission to the cylinder.

5. In a combustion motor, a fuel superheater, a cylinder, a regulating valve, a removable cylinder head, a double valve located in a chamber in the said cylinder head controlling ports for the admission of fuel to the said chamber and the passage of fuel from the said chamber to the said cylinder, means for conveying fuel from the said fuel superheater to the fuel admission port to the said chamber, and means for regulating said regulating valve to control the passage of fuel to the said port.

6. In a combustion motor, a fuel superheater, a cylinder, a regulating valve, a removable head for the cylinder having a chamber therein, a hollow double inlet valve passing through the chamber in the removable cylinder head and controlling a port for the admission of fuel to the said chamber and a port for the passage of fuel from the chamber to the cylinder, means for conveying fuel from the said fuel superheater through said regulating valve to the inlet port to the said chamber, means for actuating said regulating valve to control the passage of the fuel to the said inlet port, and a heated recess through which the fuel passes from the said chamber to the cylinder.

PIETRO GALASSO.